Patented May 20, 1941

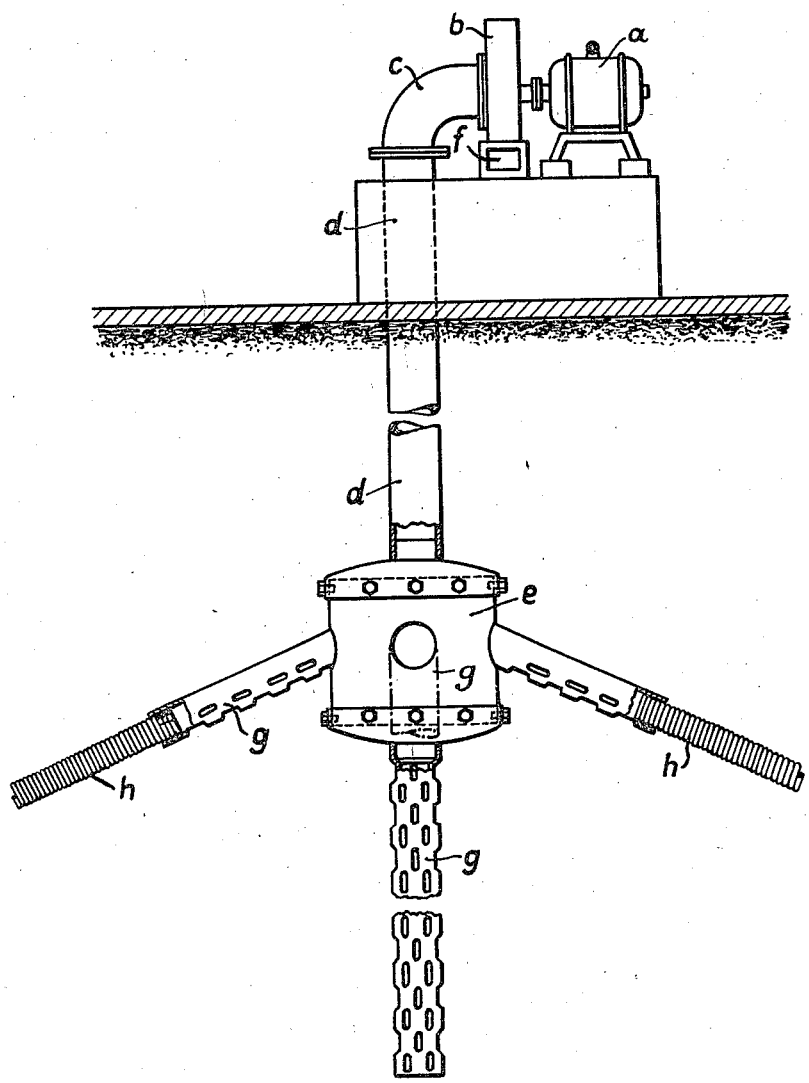

2,242,378

UNITED STATES PATENT OFFICE 2,242,378

VENTILATION OF ROOMS AND THE LIKE

Wilhelm Vollbach, Cologne-Worringen, and Josef Hennig, Cologne-Ehrenfeld, Germany, assignors to "Marschall" Auto-Motorradteile-Vertrieb Körnig & Co. Kom. Ges., Cologne-Ehrenfeld, Germany Application March 10, 1938, Serial No. 195,170
In France March 31, 1937

3 Claims. (Cl. 98—1)

This invention relates to a method of and a device for ventilating, cooling and heating rooms of all kinds, more particularly totally enclosed spaces, such as air raid shelters, hangars, motor car garages, halls, work-shops in factories, greenhouses, storage cellars, larders, stables and other rooms and the like, which are to be ventilated or the air of which is to be tempered, the air being, in accordance with the invention, taken from the soil.

As a device for carrying out the method a rotary blower or a piston pump or the like may be used, which is connected with a suction pipe.

According to the invention, for withdrawing the air from the soil a suction pipe having a strainer at its end is sunk in the soil and this suction pipe is connected to the suction side of an air pump or the like. On the strainer air guiding pipes or helices may also be provided, which act as air guiding means and which are introduced into the soil. On the conveying pump being put in operation, it will be found that a strong stream of air of uniform temperature leaves the pump on the delivery side.

The arrangement operates as follows: Through the vacuum produced in the strainer the air contained in the more or less porous soil is caused to flow into the place of lower pressure. The air thus withdrawn out of the soil is then conveyed into the respective rooms which are to be ventilated. In the case of air raid shelters and the like the drawn-in air may be kept at a greater pressure than the outer air as a protection against any gases penetrating from the outside. Tests which have been carried out have shown, that it is possible to withdraw air from the soil not only in the case of gravel soil, but also where the soil is very heavy clay soil.

It is essential that the suction pipe should be made so tight to the outside and be sunk so deep in the soil that no outer air from above the earth's surface can penetrate into the suction pipe, so that only well filtered air from the soil will be supplied to the rooms.

The pumps may be driven electrically or by any other suitable prime mover. In the case of air-raid shelters more particularly it is necessary further to provide operation by hand as well, so as not to endanger the persons using the shelter through the plant becoming useless, owing to disturbances in the current supply or at the driving machines.

A further advantage consists in the use of the air taken from the soil for tempering the air in the rooms, that is either for cooling or for heating the room temperature according to circumstances.

In the accompanying drawing a constructional example of the arrangement according to the invention is shown diagrammatically.

By the motor $a$ the blower $b$ is driven. The suction side of the blower is connected by the bend $c$ to the suction pipe $d$ which extends as low as possible into the soil and terminates in the air reservoir $e$. The air reservoir itself may be of any form, but would preferably be cylindrical, in order better to withstand the pressure of the soil. The dimensions of the air reservoir and of the suction pipe depend in the usual way on the quantity of air to be conveyed. In order to ensure a good and safe supply of sucked-in air from the soil to the air reservoir, whatever the condition of the soil, the air reservoir $e$ is further supplied with air-conveying pipes $g$ and guiding helices $h$, which extend still deeper into the soil. The pipes $g$ are perforated so as to guide the air into the inlets of the air reservoir and produce a straining action. The helices $h$ are wound to form tubular members with the helices preferably touching so as to function in the same manner as the perforated pipes $g$, the air being drawn into the interior of the tubular members between the helices. In the constructional form illustrated, the helices $h$ are not connected directly up to the air reservoir $e$ but to short perforated pipes $g$ which deliver to the reservoir $e$. By this means all the air passing through the air reservoir is filtered by a layer of soil of a sufficient depth to prevent the ingress of noxious vapours or gas in the outside air, the perforated pipes $g$ and helices $h$ facilitating the withdrawal of air from the soil.

Instead of being driven by a motor, the air pump or the blower $b$ may also be driven through transmission gearing by means of a hand-operated crank or a hand-operated wheel.

In addition to the various possible uses mentioned at the commencement of the specification, the method and the suction device is of special importance for ventilating rooms and the like for tropical regions, as the air can be withdrawn from the soil at a temperature of about $+12°$ C., whereby the room temperature prevalent in such places is considerably reduced and brought to a bearable average temperature.

Besides the cooling effect produced by means of air from the soil it is also possible to obtain a heating of the room temperature for instance in frosty weather.

Thus, for instance, in the case of motor-car garages it has been found, that at −10° C. outside temperature, by introducing air from the soil which had a temperature of about +10° C., the temperature in the garage was +5° C., so that the motor-cars housed in the garage were unaffected and always ready for starting up, with the result that these rooms require no special heating installation. Hence, by taking the air from the soil, it is possible to obtain not only a satisfactory ventilation, but also a favourable temperature equalisation both for the cooling and for the heating of rooms.

The method can be employed very effectively in the case of loose or porous soil. It may however also be used in regions where the rock comes very near the surface, if in such cases sufficiently large pits filled with soil are sunk, into which the suction pipe is placed. Any special filtering of the soil air is not necessary, as the soil itself acts as a large filter and the deleterious substances are held back in it. The strainer must therefore be sunk as low as possible in the soil, in order that the filtering layer of soil shall be as thick as possible.

As regards the possible uses of the air obtained from the soil the following may be stated:

As the air from the soil has a considerable moisture content, this method is also very suitable for the textile industry and numerous other uses, in which case the air moisture may be further increased by suitable means or other expedients. Furthermore, the soil air, the temperature of which is about +10 to 12° C. may be used in the colder seasons of the year or in colder regions as a source of heat and in the hotter seasons of the year or in tropical regions as a source of cold.

The effect of the cooling can be further increased according to the purpose for which it is being used, for instance by treating the soil air with water or other cooling agents or arrangements, in order to obtain a lower temperature than that of the normal soil air.

It is also possible to increase the temperature of the soil air, for instance by means of electric resistances or other suitable means, in order to bring the temperature of the soil air up to that required for special purposes.

It is thus possible to use the soil air not only for ventilation purposes but also for cooling and heating installations in the place of the means hitherto employed. Besides the climatization of rooms the tempered soil air can also be caused to act as a cold or hot stream of air on articles to be cooled or heated.

Through the enriching of the air with substances contained in the soil there is the further possibility of using the soil air for medicinal purposes.

As compared with climatization plants as hitherto used, in which the outer air is filtered, important technical and economical advantages are obtained with the arrangement according to the invention through the simultaneous ventilation and tempering by means of air from the soil.

What we claim is:

1. A plant for ventilating and tempering rooms of all kinds, comprising an air pump arranged to deliver air to the room to be ventilated, an air reservoir having a plurality of inlets and perforated air conveying pipes connected to said inlets and snugly engaged by the soil for guiding the soil air to said inlets, said air conveying pipes and inlets being located below the surface of the soil at such a depth that any air passing through said inlets into the air reservoir from above the surface of the soil is filtered by a vertical layer of soil sufficient to prevent the ingress into the reservoir of noxious vapours or gas in the air at the surface, and a suction pipe connected up to said air pump and air reservoir, so as to enable the air pump to draw filtered air from said reservoir.

2. A plant for ventilating and tempering rooms of all kinds, comprising an air pump arranged to deliver air to the room to be ventilated, an air reservoir having a plurality of inlets and air conducting helices connected to said inlets and snugly engaged by the soil for guiding the soil air to the inlets, said air conducting helices and inlets being located below the surface of the soil at such a depth that any air passing through said inlets into the air reservoir from above the surface of the soil is filtered by a vertical layer of soil sufficient to prevent the ingress into the reservoir of noxious vapours or gas in the air at the surface, and a suction pipe connected up to said air pump and air reservoir, so as to enable the air pump to draw filtered air from said reservoir.

3. A plant for ventilating and tempering rooms of all kinds, comprising an air pump arranged to deliver air to the room to be ventilated, an air reservoir having a plurality of inlets and perforated air conveying pipes connected to said inlets, air conducting helices connected to said inlets, conveying pipes and snugly engaged by the soil, said air conveying pipes, air conducting helices and inlets being located below the surface of the soil at such a depth that any air passing through said inlets into the air reservoir from above the surface of the soil is filtered by a vertical layer of soil sufficient to prevent the ingress into the reservoir of noxious vapours or gas in the air at the surface, and a suction pipe connected up to said air pump and air reservoir, so as to enable the air pump to draw filtered air from said reservoir.

WILHELM VOLLBACH.
JOSEF HENNIG.